(12) United States Patent
Nakamura et al.

(10) Patent No.: US 8,983,330 B2
(45) Date of Patent: Mar. 17, 2015

(54) POWER SUPPLY, IMAGE FORMING DEVICE, AND POWER SUPPLY METHOD

(71) Applicants: Akinobu Nakamura, Hyogo (JP); Yutaka Aso, Osaka (JP); Fuminori Tsuchiya, Osaka (JP); Susumu Miyazaki, Osaka (JP); Keita Yoshikawa, Hyogo (JP); Tatsuya Miyadera, Osaka (JP); Motohiro Kawanabe, Osaka (JP)

(72) Inventors: Akinobu Nakamura, Hyogo (JP); Yutaka Aso, Osaka (JP); Fuminori Tsuchiya, Osaka (JP); Susumu Miyazaki, Osaka (JP); Keita Yoshikawa, Hyogo (JP); Tatsuya Miyadera, Osaka (JP); Motohiro Kawanabe, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 72 days.

(21) Appl. No.: 13/773,780

(22) Filed: Feb. 22, 2013

(65) Prior Publication Data

US 2013/0223867 A1 Aug. 29, 2013

(30) Foreign Application Priority Data

Feb. 27, 2012 (JP) ................................. 2012-039894

(51) Int. Cl.
*G03G 15/00* (2006.01)
*H02M 7/12* (2006.01)
*H02M 3/335* (2006.01)
*H02M 7/217* (2006.01)
*H02M 1/00* (2006.01)

(52) U.S. Cl.
CPC ............ *H02M 7/12* (2013.01); *H02M 3/33561* (2013.01); *H02M 7/217* (2013.01); *H02M 2001/0032* (2013.01); *Y02B 70/16* (2013.01)
USPC .......................................................... 399/88

(58) Field of Classification Search
CPC .............. G03G 15/80; G03G 15/5004; H02M 3/33507; H02M 7/217
USPC .......................................................... 399/88
See application file for complete search history.

(56) References Cited

U.S. PATENT DOCUMENTS

2004/0105198 A1 6/2004 Fujii
2012/0026532 A1* 2/2012 Arimoto ...................... 358/1.14
2012/0155910 A1* 6/2012 Sato ................................ 399/88

FOREIGN PATENT DOCUMENTS

JP 2004-088853 3/2004

OTHER PUBLICATIONS

Machine translation of Fujii, JP 02004088853 A, publication date: Mar. 18, 2004.*

* cited by examiner

*Primary Examiner* — Clayton E Laballe
*Assistant Examiner* — Frederick Wenderoth
(74) *Attorney, Agent, or Firm* — Harness, Dickey & Pierce, P.L.C.

(57) ABSTRACT

Disclosed is a power supply including a first voltage generating unit that generates a first voltage from an external power supply; a second voltage generating unit that generates a first predetermined voltage and supplies the generated first predetermined voltage to the load; a third voltage generating unit that generates the first predetermined voltage and supplies the generated first predetermined voltage to the load; and a controller that causes the first voltage to be greater than or equal to a second voltage during a first mode, and causes the first voltage to be less than the second voltage during a second mode. During the first mode, the power is supplied from the second voltage generating unit and the third voltage generating unit to the load, and during the second mode, the power is supplied from the third voltage generating unit to the load.

11 Claims, 9 Drawing Sheets

POWER SUPPLY, IMAGE FORMING DEVICE, AND POWER SUPPLY METHOD

BACKGROUND OF THE INVENTION

1. Field of the Invention

Embodiments of the present invention relate to a power supply, an image forming device, and a power supply method.

2. Description of the Related Art

Due to growing awareness of environmental problems in recent years, power saving has been required for various devices. Even in various types of standards, regulations on power consumption during power saving modes have been reinforced.

As a method of achieving power saving in various devices, for example, it has been considered to shut down power supply to the systems that are not used during a standby mode, and also to terminate the portions within a device that are not used during the standby mode. Additionally a method has been considered in which a main CPU is terminated during the standby mode by introducing an IC which is dedicated for network responses.

Unfortunately, for a case of generating a direct current voltage from a commercial alternating-current power supply, in general, the efficiency is reduced as the value of the direct current voltage to be generated is lowered. Since the efficiency of generating a low voltage, which is supplied to a load during the power saving mode, is reduced, even if the power consumption during the standby mode is reduced in the devices, it is not always true that the power saving is achieved.

Patent Document 1 discloses, for example, a power supply that can reduce an amount of power consumption during a power saving mode. In the power supply, a switching regulator and a series regulator are arranged in parallel. During a normal operating mode, the switching regulator is utilized. That is because the efficiency of the switching regulator is better. During the power saving mode, since an amount of the power consumed inside the series regulator is small, the series regulator is utilized.

Patent Document 1: Japanese Patent Laid-Open Application No. 2004-88853

SUMMARY OF THE INVENTION

When a difference between an input voltage and an output voltage is large, power loss of the series regulator is large, compared to that of the switching regulator. During a power saving mode where the difference between the input voltage and the output voltage is large, such as a case where an input voltage of 24 V is converted into an output voltage of 5 V, the power loss caused by the series regulator can be large, and the amount of power consumption may not be reduced.

The present invention has been achieved in view of the above described problem. An objective of the present invention is to provide a power supply that can efficiently generate a voltage which is supplied to a load during a power saving mode.

In one aspect of the present invention, there is provided a power supply configured to supply power to a load during a first mode and a second mode, the power supply including a first voltage generating unit configured to generate a first voltage from an external power supply;

a second voltage generating unit configured to generate a first predetermined voltage and configured to supply the generated first predetermined voltage to the load, wherein the second voltage generating unit is coupled to the first voltage generating unit, and the second voltage generating unit is configured to operate when the first voltage is greater than or equal to a second voltage;

a third voltage generating unit configured to generate the first predetermined voltage from the first voltage and configured to supply the generated first predetermined voltage to the load, the third voltage generating unit being coupled to the first voltage generating unit; and a controller configured to cause the first voltage generated by the first voltage generating unit to be greater than or equal to the second voltage during the first mode, and configured to cause the first voltage generated by the first voltage generating unit to be less than the second voltage during the second mode, wherein, during the first mode, the power is supplied from at least one of the second voltage generating unit and the third voltage generating unit to the load, and wherein, during the second mode, the power is supplied from the third voltage generating unit to the load.

In another aspect of the present invention, there is provided an image forming device including a power supply configured to supply power to a load during a first mode and a second mode, wherein the power supply includes a first voltage generating unit configured to generate a first voltage from an external power supply;

a second voltage generating unit configured to generate a first predetermined voltage and configured to supply the generated first predetermined voltage to the load, wherein the second voltage generating unit is coupled to the first voltage generating unit, and the second voltage generating unit is configured to operate when the first voltage is greater than or equal to a second voltage;

a third voltage generating unit configured to generate the first predetermined voltage from the first voltage and configured to supply the generated first predetermined voltage to the load, the third voltage generating unit being coupled to the first voltage generating unit; and a controller configured to cause the first voltage generated by the first voltage generating unit to be greater than or equal to the second voltage during the first mode, and configured to cause the first voltage generated by the first voltage generating unit to be less than the second voltage during the second mode, wherein, during the first mode, the power is supplied from at least one of the second voltage generating unit and the third voltage generating unit to the load, and wherein, during the second mode, the power is supplied from the third voltage generating unit to the load.

In another aspect of the present invention, there is provided a power supply method of supplying power to a load during a first mode and a second mode, the power supply method including a first voltage generating step of generating a first voltage from an external power supply;

a second voltage generating step of generating, when the first voltage is greater than or equal to a second voltage, a first predetermined voltage from the first voltage generated at the first voltage generating step and supplying the generated first predetermined voltage to the load; and a third voltage generating step of generating the first predetermined voltage from the first voltage generated at the first voltage generating step and supplying the generated first predetermined voltage to the load, wherein, during the first mode, the first voltage generated at the first voltage generating step is greater than or equal to the second voltage, and wherein, during the second mode, the first voltage generated at the first voltage generating step is less than the second voltage.

According to the embodiments of the present invention, there can be provided a power supply that can efficiently generate a voltage that is supplied to a load during a power saving mode.

Other objects, features and advantages of the present invention will become more apparent from the following detailed description when read in conjunction with the accompanying drawings.

DETAILED DESCRIPTION OF THE PREFERRED EMBODIMENTS

Hereinafter, embodiments of the present invention are explained by referring to the accompanying drawings. In each of the drawings, duplicated explanations may be omitted by attaching the same symbols to similar portions of corresponding configurations.

[First Embodiment]
<Configuration of Power Supply>

Figure 1:
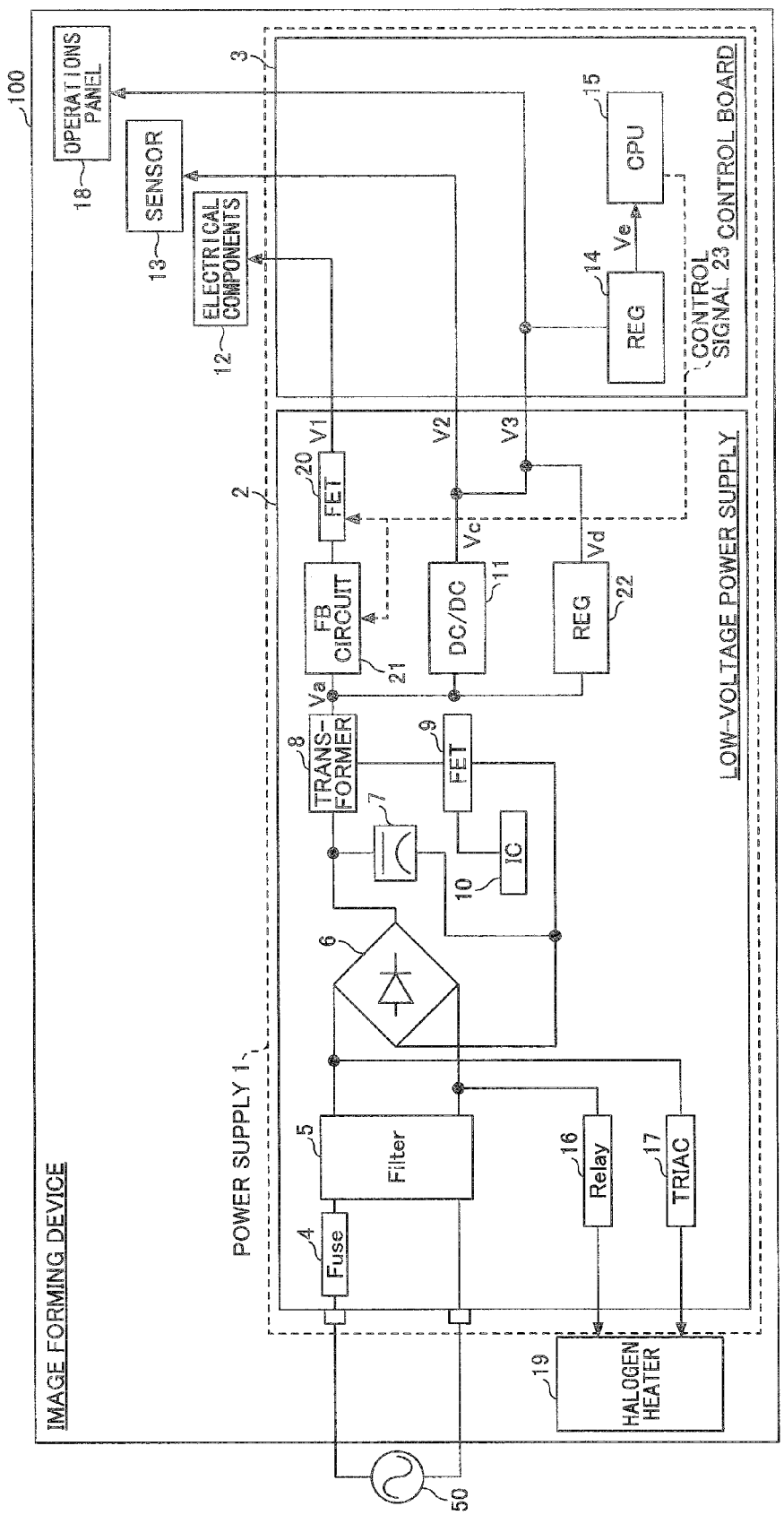
FIG. 1 is a diagram exemplifying a schematic configuration of a power supply according to a first embodiment.

FIG. 1 is a diagram exemplifying a schematic configuration of a power supply 1 according to a first embodiment.

As shown in FIG. 1, the power supply 1 according to the first embodiment is disposed in an image forming device 100. The image forming device 100 includes a photosensitive body (not shown), an exposing unit (not shown), a developing unit (not shown), and a fixing unit (not shown). The image forming device 100 prints a toner image on a recording medium such as a sheet of paper by an electrophotographic method.

The power supply 1 includes a low-voltage power supply 2 and a control board 3.

The low-voltage power supply 2 is connected to a commercial power supply 50, which is an external power supply. The low-voltage power supply 2 supplies an alternating current voltage to a halogen heater 19 attached to the fixing unit of the image forming device 100. The low-voltage power supply 2 generates a direct current voltage and supplies the generated direct current voltage to the control board 3.

The low-voltage power supply 2 generates a direct current voltage Va by converting an alternating current voltage by using a noise filter 5; a diode bridge 6; an aluminum electrolytic capacitor 7; a transformer 8; a field effect transistor (FET) 9 for switching; and a control IC 10. The generated voltage Va is supplied to the control board 3 through a feedback circuit 21 and an FET 20. The feedback circuit 21 performs feedback control to make the voltage Va to be a predetermined voltage. The voltage Va is converted into a voltage Vc by using a switching regulator (DC/DC) 11. The voltage Va is also converted into a voltage Vd by using a series regulator (REG) 22. The voltage Vc and the voltage Vd are supplied to the control board 3. Here, the switching regulator 11 operates to generate the voltage Vc only if the supplied voltage Va is greater than or equal to a threshold value Vb. The switching regulator 11 does not operate when the voltage Va is less than the threshold value Vb. In this case, the switching regulator 11 terminates supplying the power to the control board 3. Further, the power supply 1 includes an AC voltage supply unit including a relay 16 and a triode for alternating current (TRIAC) 17. The AC voltage supply unit supplies an alternating current to the halogen heater 19 of the image forming device 100.

The control board 3 supplies the voltage Va to electrical components 12 such as a motor and a fan. The voltage Va is supplied from the feedback circuit 21 and the FET 20 of the low-voltage power supply 2. The control board 3 supplies the voltage Vc or the voltage Vd to a sensor 13, an operations panel 18, and the like. The voltage Vc is supplied from the switching regulator 11, and the voltage Vd is supplied from the series regulator 22. Further, a series regulator 14 disposed in the control board 3 generates a voltage Ve from the voltage supplied from the low-voltage power supply 2, and the series regulator 14 supplies the power to a CPU 15 as a control unit.

Hereinafter, in the power supply 1, the voltage supplied from the feedback circuit 21 and the FET 20 of the low-voltage power supply 2 to the control board 3 is denoted by V1. The voltage supplied from the switching regulator 11 to the control board 3 is denoted by V2. The voltage supplied from the switching regulator 11 or from the series regulator 22 to the control board 3 is denoted by V3.

In the low-voltage power supply 2 of the power supply 1 according to the first embodiment, during formation of an image by the image forming device 100, the direct current voltage Va is set to be 24 V. Here, the direct current voltage Va is generated from the power from the commercial power supply 50. The threshold value Vb for the switching regulator 11 to operate is 8 V. The direct current voltage Vc which is generated by the switching regulator 11 is 5 V. The direct current voltage Vd which is generated by the series regulator 22 from the voltage Va is also 5 V. The direct current voltage Ve, which is supplied from the series regulator 14 of the control board 3 to the CPU 15, is 3.3 V. The series regulator 14 generates the direct current voltage Ve from the power supplied from the low-voltage power supply 2. Here, the voltages Va-Ve generated by the low-voltage power supply 2 are not limited to the above-described values. The values of the voltages Va-Ve may be set to be corresponding suitable values.

<Switching from Normal Mode to Power Saving Mode>

Operating modes of the power supply 1 include the normal mode and the power saving mode. In the normal mode, the power supply 1 supplies power to the corresponding loads, which are the electrical components 12, the sensor 13, the operations panel 18, and the like. In the power saving mode, the power is supplied only to a portion of the loads of the image forming device 100.

The normal mode is a mode where the power is supplied from the power supply 1 to the electrical components 12, the sensor 13, the operations panel 18, the halogen heater 19, and the like, and where the image forming device 100 can print an image on a sheet of paper. The power saving mode is a mode where the power supply 1 only supplies the power to the minimum number of units, such as the CPU 15 which is required for a job request or a network response; and the operations panel 8, during waiting time, for example, in which the image forming device 100 is not used for more than or equal to a predetermined time period. Namely, the power saving mode is the mode where the power consumption is reduced by shutting down the supply of the power to the disused portion.

Figure 2:
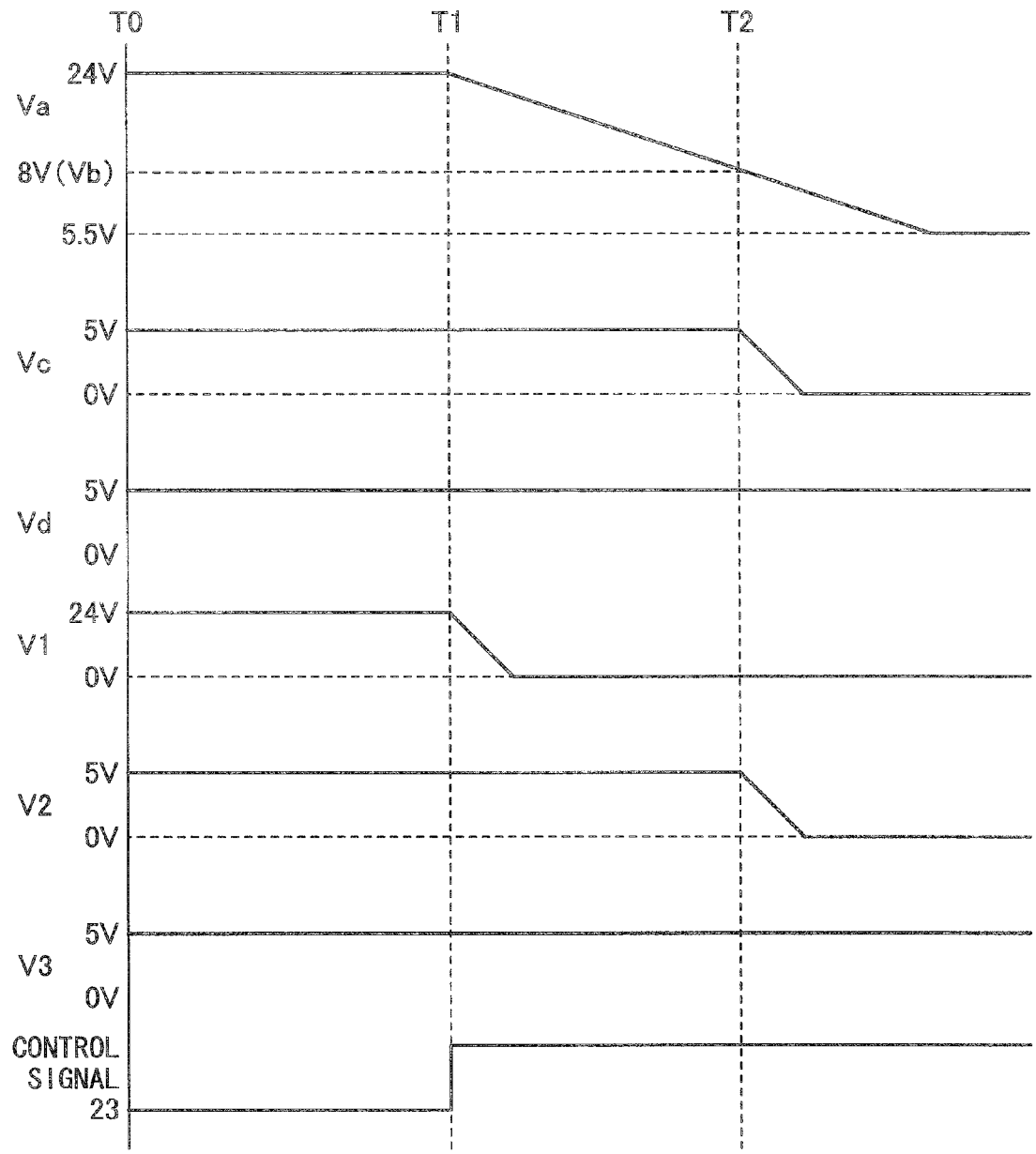
FIG. 2 is a diagram exemplifying a power sequence during switching from a normal mode to a power saving mode in the power supply according to the first embodiment.

FIG. 2 is a diagram exemplifying a power sequence during switching from the normal mode to the power saving mode in the power supply 1 according to the first embodiment.

In the first embodiment, during the normal mode which is from time T0 to time T1, the feedback circuit 21 controls the voltage Va to be 24 V, and the FET 20 supplies the voltage of 24 V to the control board 3 (Va=V1=24 V). At the same time, the switching regulator 11 and the series regulator 22 generate the voltages of 5 V from the corresponding input voltages of 24 V, and supply the generated voltages of 5V to the control board 3 (Vc=Vd=V2=V3=5 V).

At the time T1 of switching from the normal mode to the power saving mode, a control signal 23 is transmitted from the CPU 15 to the FET 20, and thereby the FET 20 shuts down the supply of power to the control board 3. Additionally, the CPU 15 transmits the control signal 23 to the feedback circuit 21, and thereby the feedback circuit 21 changes the value of the voltage Va from 24 V to 5.5 V. The voltage Va is supplied to the switching regulator 11 and the series regulator 22.

Accordingly, as shown in FIG. 2, the voltage V1 is shut down at the time T1 (V1=24 V→0 V), and the voltage Va gradually decreases from 24 V. The switching regulator 11 operates when the input voltage is greater than or equal to 8 V, and the switching regulator 11 terminates when the input voltage is less than 8 V. After the voltage Va gradually decreases, the voltage Va becomes smaller than 8 V at the time T2. At the time T2, the supply of power from the switching regulator 11 is terminated (Vc=V2=5 V→0 V).

The series regulator 22 continues operating from the time period of the normal mode. During the power saving mode subsequent to the time T2, in which the switching regulator 11 terminates operating, the power is supplied only from the series regulator 22 to the control board 3. The voltage Va eventually becomes 5.5 V, and the series regulator 22 generates the voltage of 5 V from the voltage of 5.5 V. In this manner, the power loss in the series regulator 22 can be reduced by controlling the value of the voltage which is input to the series regulator 22 to be a small value, during the power saving mode. In addition, by reducing the difference between the input voltage to and the output voltage from the series regulator 22, the power can be efficiently supplied.

Further, at the time T1 of switching the normal mode to the power saving mode, the low-voltage power supply 2 terminates supplying the power to the halogen heater 19 of the image forming device 100 by shutting down the relay 16.

Figure 3:
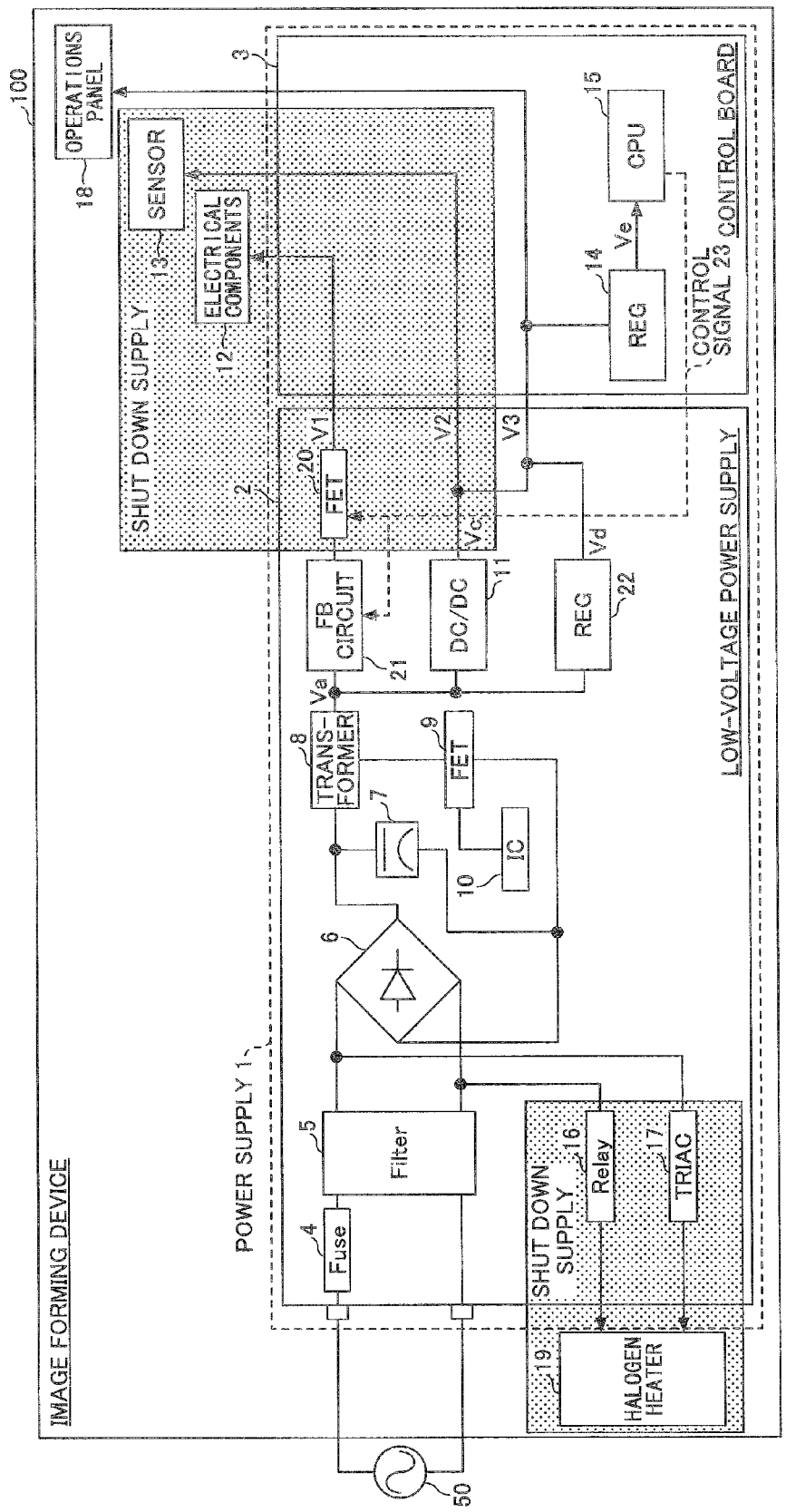
FIG. 3 is a diagram exemplifying a power supplying state during a power saving mode in the power supply according to the first embodiment.

FIG. 3 is a diagram exemplifying a power supplying state during the power saving mode in the power supply 1 according to the first embodiment.

As shown in FIG. 3, during the power saving mode of the image forming device 100, the supply of power from the FET 20 and the switching regulator 11 of the low-voltage power supply 2 to the control board 3 is shut down, and the supply of power from the low-voltage power supply 2 to the halogen heater 19 of the fixing unit is shut down. The amount of the power consumption is reduced, for example, by shutting down the supply of power from the control board 3 to the electrical components 12 and the sensor 13. The power is supplied only to the minimum number of the devices which are required during the waiting time, such as the CPU 15 and the operations panel 18.

As explained above, during the normal mode, the power is supplied from the power supply 1 to the corresponding loads, which are the electrical components 12, the sensor 13, the operations panel 18, the halogen heater 19, and the like. During the power saving mode, the control board 3 of the power supply 1 supplies the power which is supplied from the series regulator 22 of the low-voltage power supply 2 only to the CPU 15 and the operations panel 18 of the power supply 1.

During the power saving mode, the switching regulator 11 is terminated and only the series regulator 22 is operated by decreasing the value of the voltage which is input to the switching regulator 11 and the series regulator 22. At this time, the power can be efficiently supplied by decreasing the value of the voltage which is input to the series regulator 22, and by reducing the difference between the input voltage to the series regulator 22 and the output voltage from the series regulator 22. With the power supply 1 according to the first embodiment, the amount of the power consumption during the power saving mode can further be reduced.

Here, instead of changing the setting of the voltage Va by the feedback circuit 21 based on the control signal 23 from the CPU 15, the control IC 10 may be switched to the power saving mode by the control signal 23 from the CPU 15 by defining, in advance, a control frequency for switching by the control IC 10 during the power saving mode. Further, a device including the power supply 1 is not limited to the image forming device 100. The power supply 1 may be included in different electronic equipment.

[Second Embodiment]

Next, a second embodiment is explained by referring to the figures. Here, explanations are omitted for components which are the same as the corresponding components of the first embodiment.

Figure 4:
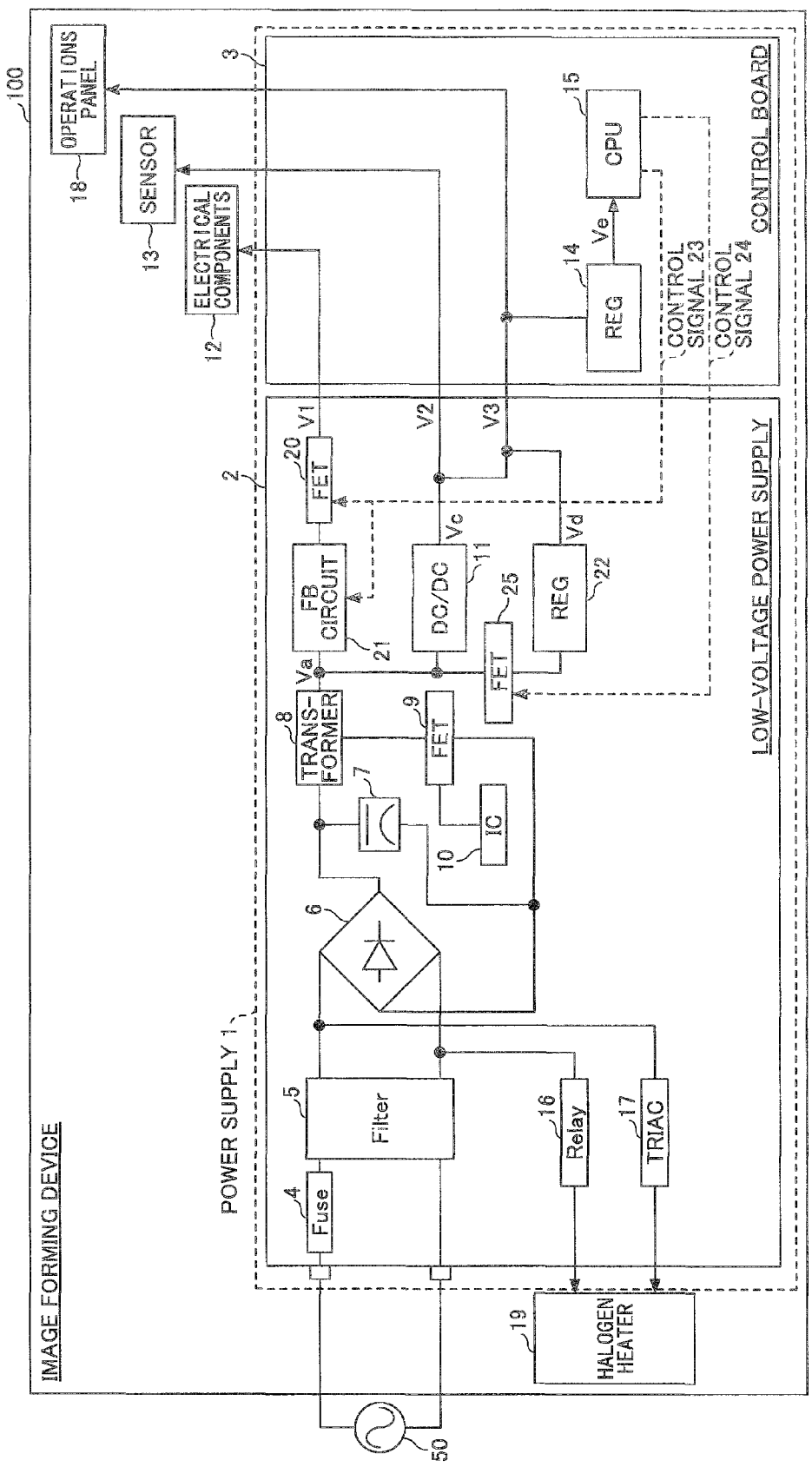
FIG. 4 is a diagram exemplifying a schematic configuration of the power supply according to a second embodiment.

FIG. 4 is a diagram exemplifying a schematic configuration of the power supply 1 according to the second embodiment. The power supply 1 according to the second embodiment is different from the power supply 1 according to the first embodiment in the point that an FET 25 is disposed between the transformer 8 and the series regulator 22.

Based on a control signal 24 from the CPU 15, during the normal mode, the FET 25 sets a state between the transformer 8 and the series regulator 22 to be a cut off state. During the power saving mode, the FET 25 sets the state between the transformer 8 and the series regulator 22 to be a conducting state.

Figure 5:
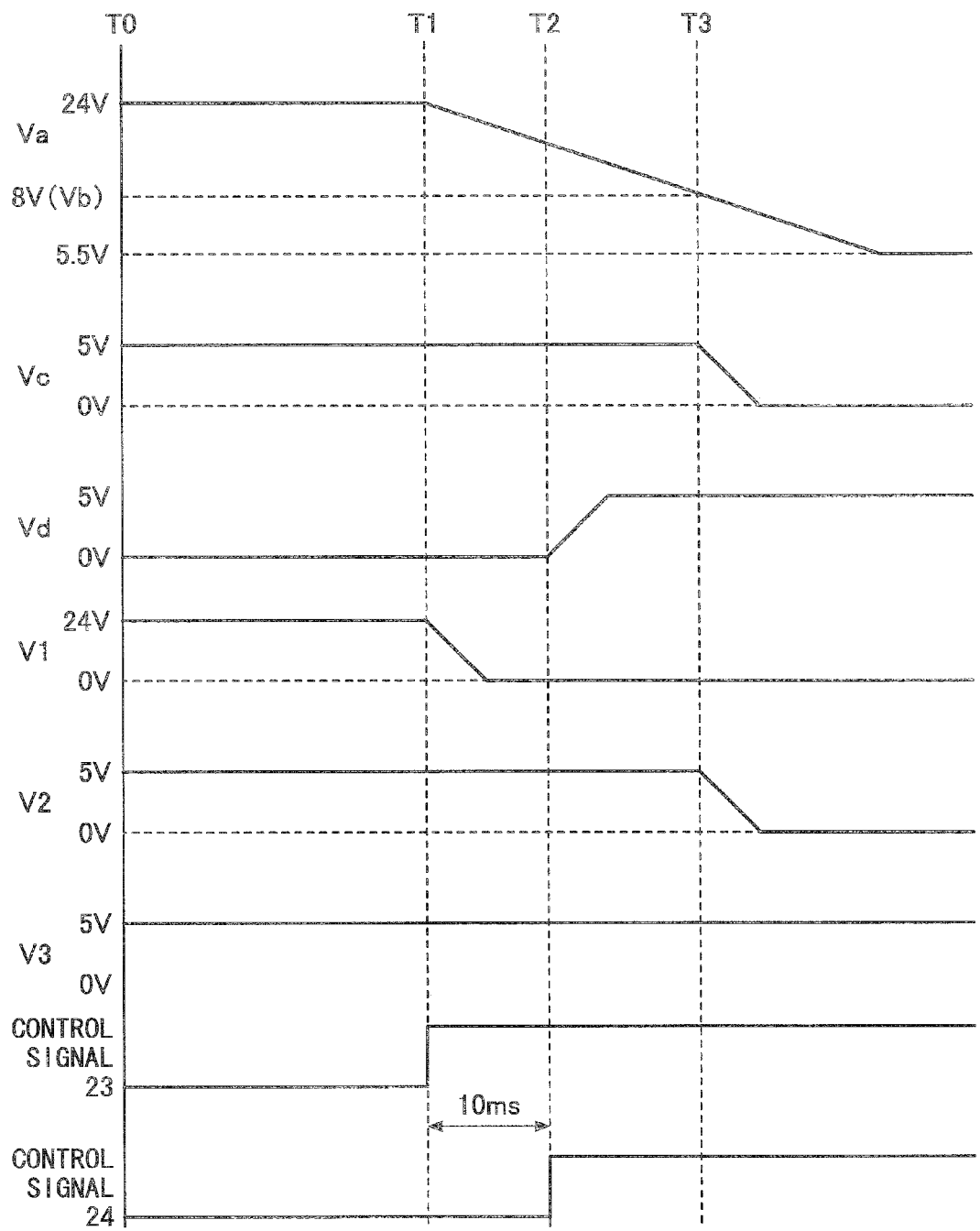
FIG. 5 is a diagram exemplifying a power sequence during switching from the normal mode to the power saving mode in the power supply according to the second embodiment.

FIG. 5 is a diagram exemplifying a power sequence during switching from the normal mode to the power saving mode in the power supply 1 according to the second embodiment.

During the normal mode which is from the time T0 to the time T1, the feedback circuit 21 controls the voltage Va to be 24 V, and the FET 20 supplies 24 V to the control board 3 (Va=V1=24 V). The switching regulator 11 generates the voltage of 5 V from the input voltage of 24 V, and the switching regulator 11 supplies the generated voltage to the control board (Vc=V2=V3=5 V).

At the time T1 of switching from the normal mode to the power saving mode, the control signal 23 is transmitted from the CPU 15 to the FET 20. The FET 20 shuts down the supply of power to the control board 3 (V1=24 V→0 V). Additionally, the CPU 15 transmits the control signal 23 to the feedback circuit 21. The feedback circuit 21 changes the value of the voltage Va from 24 V to 5.5 V.

Further, the CPU 15 transmits the signal 24 for switching the state of the FET 25 to be the conducting state. When the state of the FET 25 is switched to the conducting state, the series regulator 22 starts supplying the power to the control board 3 (Vd=0 V→5 V). Here, the CPU 15 may simultaneously transmit the control signal 24 and the control signal 23. However, it is preferable that the CPU 15 transmit the control signal 24, after a predetermined time period (e.g., 10 ms) elapses from the transmission of the control signal 23. By lowering the maximum value of the voltage which is input to the series regulator 22, a less expensive series regulator 22 may be used. Here, the less expensive series regulator 22 has a small value as the maximum value of the voltage that can be input to the series regulator 22. Accordingly, the cost for the components of the power supply 1 can be reduced.

Subsequent to the time T1, the voltage Va gradually decreases from 24 V. The switching regulator 11 operates when the input voltage is greater than or equal to 8 V, and the switching regulator 11 terminates when the input voltage is less than 8 V. After the voltage Va gradually decreases, the voltage Va becomes less than 8 V at the time T3. At the time T3, the supply of power from the switching regulator 11 is terminated (V2=Vc=5 V→0V). After the time T3, the voltage Va eventually becomes 5.5 V. The series regulator 22 supplies the power to the control board 3 by generating a voltage of 5 V from the voltage of 5.5 V.

According to the second embodiment, during the normal mode, the voltage V1 (24 V) is supplied from the feedback circuit 21 and the FET 20 to the control board 3, and the voltages V2 (5 V) and V3 (5 V) are supplied from the switching regulator 11 to the control board 3. The control board 3 supplies the power to the electrical components 12, the sensor 13, and the operations panel 18, based on these input voltages. In the normal mode, the series regulator 22 is shut down by the FET 25, and the series regulator 22 does not operate. Accordingly, the power loss can be prevented in the series regulator 22 during the normal mode.

In the power saving mode, the series regulator 22 supplies only the voltage V3 (5 V) to the control board 3, and the control board 3 supplies the power to the CPU 15 and the operations panel 18. At this time, the FET 25 is controlled, so that the voltage Va is input to the series regulator 22 after a predetermined time period elapses from the control of the voltage Va by the feedback circuit 21 based on the control signal 23. By such control, the maximum value of the voltage which is input to the series regulator 22 can be lowered, and the less expensive series regulator 22 can be used. The less expensive series regulator 22 has the small value as the maximum value of the voltage that can be input to the series regulator 22.

[Third Embodiment]

Next, a third embodiment is explained by referring to the figures. Here, explanations are omitted for components which are the same as the corresponding components of the previously explained embodiments.

Figure 6:
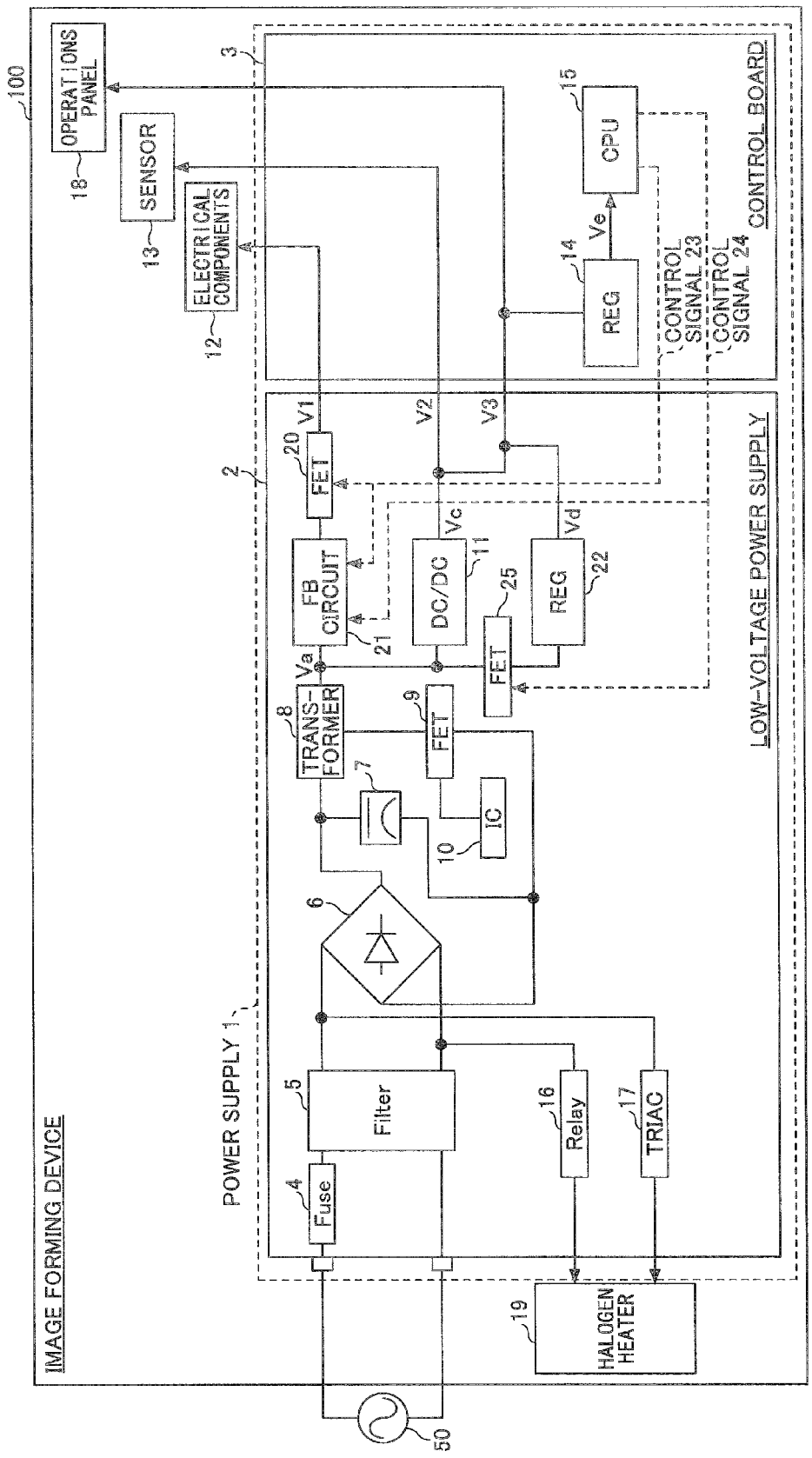
FIG. 6 is a diagram exemplifying a schematic configuration of the power supply according to a third embodiment.

FIG. 6 is a diagram exemplifying a schematic configuration of the power supply 1 according to the third embodiment. The power supply 1 according to the third embodiment is different from that of the second embodiment in the point that the CPU 15 controls the feedback circuit 21 and the FET 25 by the control signal 24.

Figure 7:
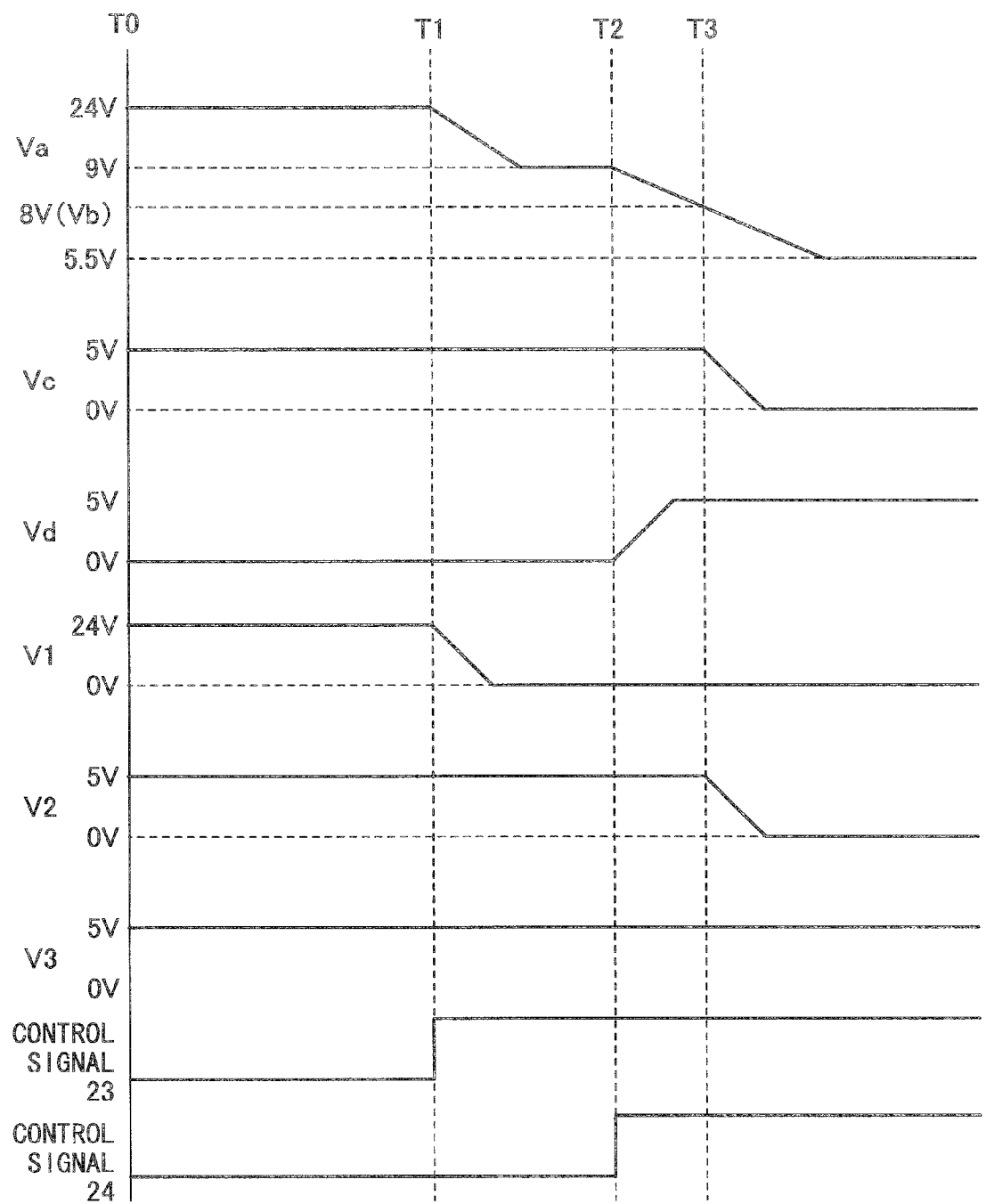
FIG. 7 is a diagram exemplifying a power sequence during switching from the normal mode to the power saving mode in the power supply according to the third embodiment.

FIG. 7 is a diagram exemplifying a power sequence during switching from the normal mode to the power saving mode in the power supply 1 according to the third embodiment.

During the normal mode which is from the time T0 to the time T1, the feedback circuit 21 controls the voltage Va to be 24 V, and the FET 20 supplies 24 V to the control board 3 (Va=V1=24 V). The switching regulator 11 generates the voltage of 5 V from the input voltage of 24 V, and the switching regulator 11 supplies the generated voltage to the control board (Vc=V2=V3=5 V). During this time, since the FET 25 is controlled to be in a cut off state, the output voltage Vd from the series regulator 22 is 0 V.

At the time T1 of switching from the normal mode to the power saving mode, the control signal 23 is transmitted from the CPU 15 to the FET 20. The FET 20 shuts down the supply of power to the control board 3 (V1=24 V→0 V). Additionally, the CPU 15 transmits the control signal 23 to the feedback circuit 21. The feedback circuit 21 changes the value of the voltage Va from 24 V to 9 V. Here, the voltage Va is supplied to the switching regulator 11 and the series regulator 22.

After sufficient time elapses from the transmission of the control signal 23 at the time T1, the value of the voltage Va becomes 9 V at the time T2. At the time T2, the CPU 15 transmits the control signal 24 to the feedback circuit 21, and the feedback circuit 21 changes the value of the voltage Va from 9 V to 5.5 V. At the same time, the CPU 15 also transmits the control signal 24 to the FET 25, and the state of the FET 25 is switched to the conducting state (Vd=0 V→5 V).

The value of the voltage Va gradually decreases. At the time T3, the value of the voltage Va becomes less than 8 V. At this time, the switching regulator 11 terminates (Vc=V2=5 V→0 V).

After the time T3, the voltage Va eventually becomes 5.5 V. The series regulator 22 generates a voltage of 5 V from the voltage of 5.5 V, and the series regulator 22 supplies the generated voltage to the control board 3 (Vd=V3=5 V).

In the third embodiment, at the time of switching from the normal mode to the power saving mode, the voltage Va is changed from 24 V to 9 V. After the sufficient time elapses, the voltage Va becomes 9 V. Subsequently, the state of the FET 25 is switched to the conducting state, and the voltage Va is changed from 9 V to 5.5 V. By such control, the value of the voltage to be input to the series regulator 22 can be set to be a small value. Accordingly, a less expensive component can be used for the series regulator 22. Here, the less expensive component has a small value as the maximum value of the voltage that can be input to the component. Subsequent to the start of the supply of the power from the series regulator 22 to the control board 3, the supply of the power from the switching regulator 11 is shut down. Accordingly, the supply of the power to the control board 3 can be continued without any interruption.

[Fourth Embodiment]

Next, a fourth embodiment is explained by referring to the figures. Here, explanations are omitted for components which are the same as the corresponding components of the previously explained embodiments.

Figure 8:
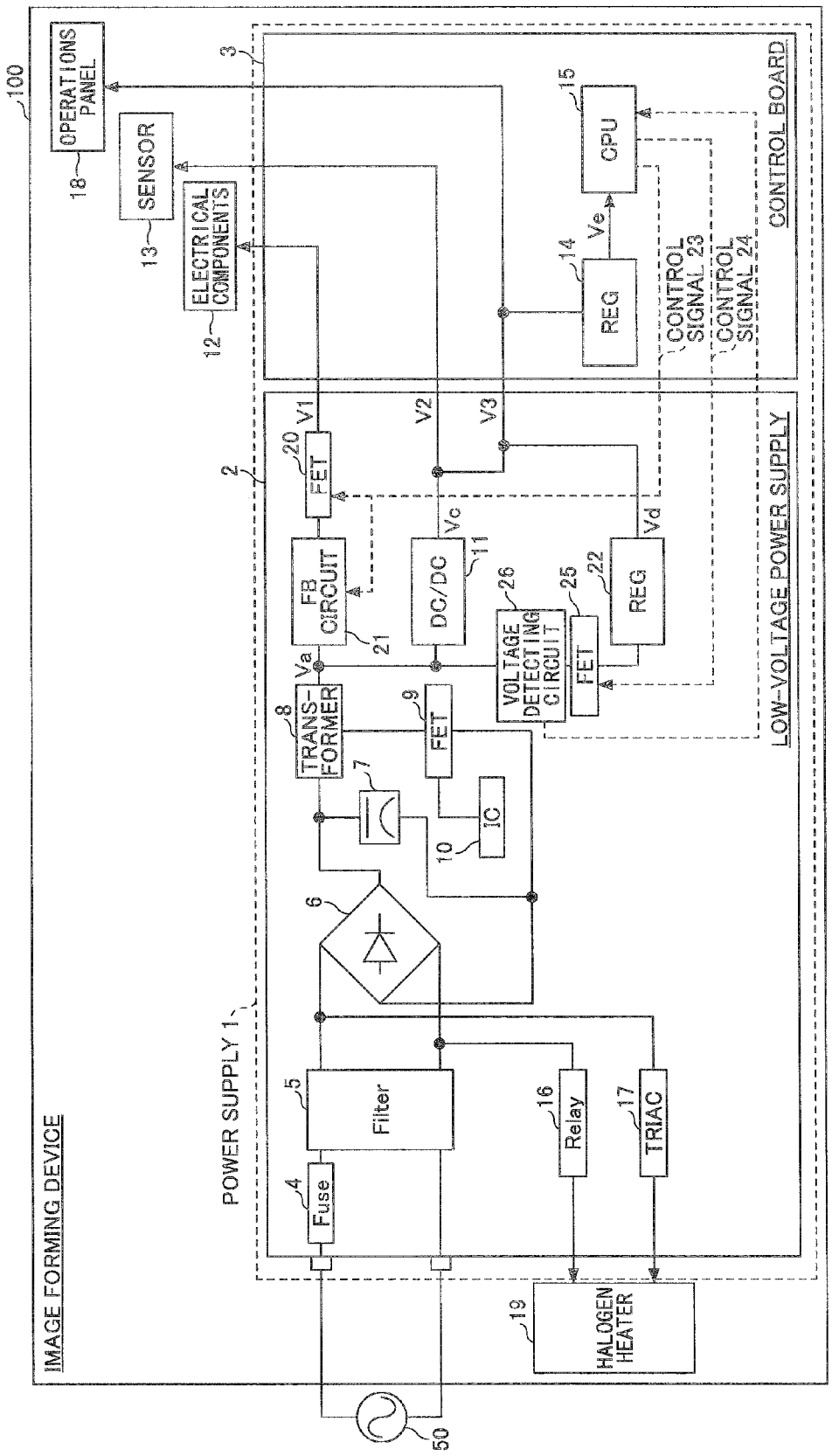
FIG. 8 is a diagram exemplifying a schematic configuration of the power supply according to a fourth embodiment.

FIG. 8 is a diagram exemplifying a schematic configuration of the power supply 1 according to the fourth embodiment. The power supply 1 according to the fourth embodiment is different from that of the second embodiment in the point that a voltage detecting circuit 26 is included for detecting the voltage Va to be input to the series regulator 22, and the CPU 15 transmits the control signal 24 based on a voltage detection result of the voltage detecting circuit 26.

The voltage detecting circuit 26 is disposed between the transformer 8 and the series regulator 22. The voltage detecting circuit 26 is a circuit that detects the voltage Va to be input to the series regulator 22. The CPU 15 retrieves the voltage detection result at every predetermined period.

Figure 9:
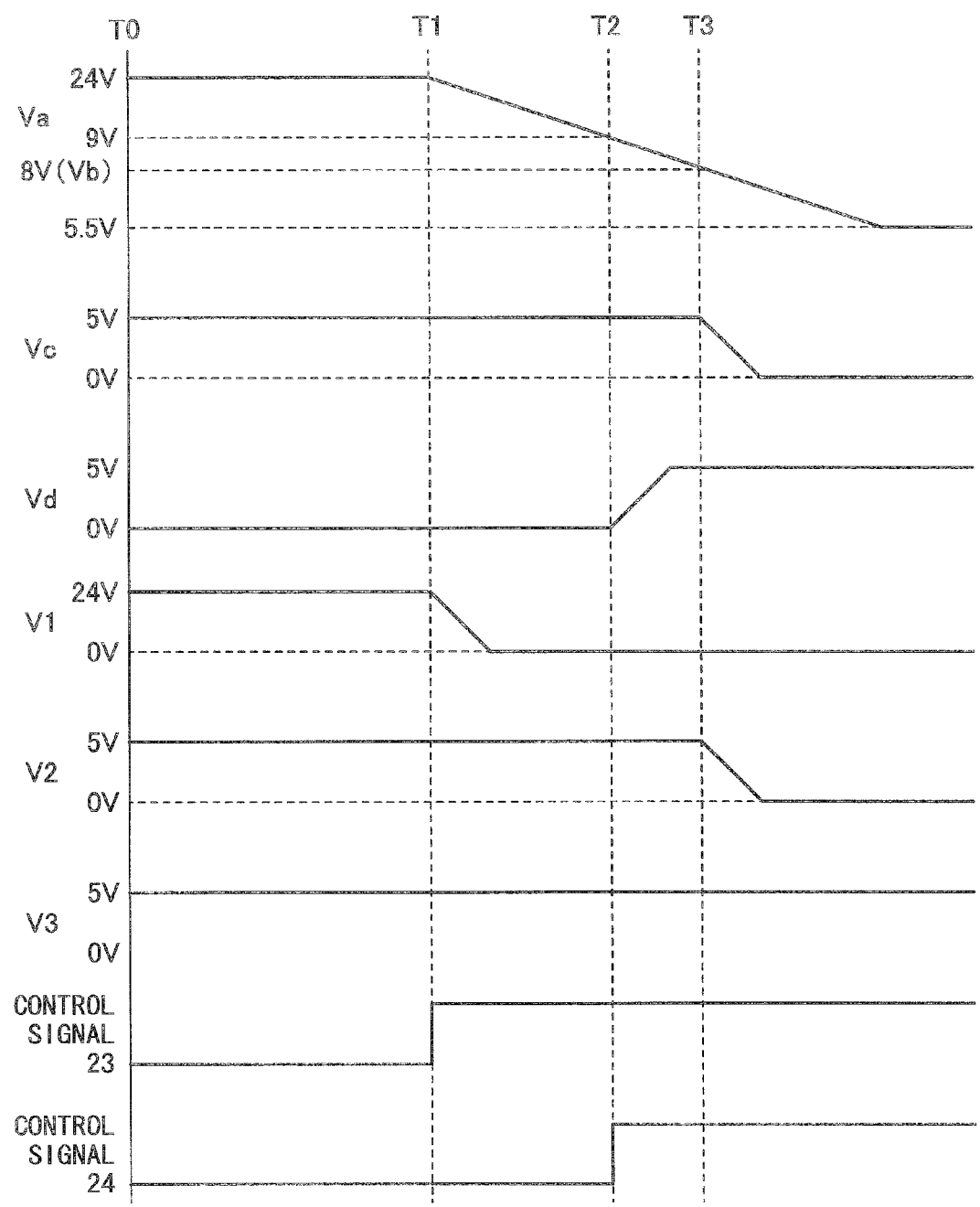
FIG. 9 is a diagram exemplifying a power sequence during switching from the normal mode to the power saving mode in the power supply according to the fourth embodiment.

FIG. 9 is a diagram exemplifying a power sequence during switching from the normal mode to the power saving mode in the power supply 1 according to the fourth embodiment.

During the normal mode which is from the time T0 to the time T1, the feedback circuit 21 controls the voltage Va to be 24 V, and the FET 20 supplies 24 V to the control board 3 (Va=V1=24 V). The switching regulator 11 generates the voltage of 5 V from the input voltage of 24 V, and the switching regulator 11 supplies the generated voltage to the control board (Vc=V2=V3=5 V). During this time, since the FET 25 is controlled to be in a cut off state, the output voltage Vd from the series regulator 22 is 0 V.

At the time T1 of switching from the normal mode to the power saving mode, the control signal 23 is transmitted from the CPU 15 to the FET 20. The FET 20 shuts down the supply of power to the control board 3 (V1=24 V→0 V). Additionally, the CPU 15 transmits the control signal 23 to the feedback circuit 21. The feedback circuit 21 changes the value of the voltage Va from 24 V to 5.5 V.

Subsequently, the voltage detecting circuit 26 detects that the value of the voltage Va to be input to the series regulator 22 becomes 9 V at the time T2. At the time T2, the CPU 15 transmits the control signal 24 to the FET 25, and the state of the FET 25 is switched to the conducting state (Vd=0 V+→5 V). The value of the voltage Va gradually decreases from the time T2. At the time T3, the value of the voltage Va becomes less than 8 V, and the switching regulator 11 terminates (Vc=V2=5 V →0 V).

After the time T3, the voltage Va eventually becomes 5.5 V. The series regulator 22 generates a voltage of 5 V from the voltage of 5.5 V, and the series regulator 22 supplies the power to the control board (Vd=V3=5 V).

In the fourth embodiment, at the time of switching from the normal mode to the power saving mode, the voltage detecting circuit 26 detects the voltage Va. At the time at which the voltage Va becomes the predetermined voltage (9 V), the state of the FET 25 is switched to the conducting state. By such control, the voltage to be input to the series regulator 22 can be set to a voltage which is less than or equal to a predetermined voltage. Accordingly, a less expensive component can be used for the series regulator 22. Here the less expensive component has a small value as the maximum value of the voltage that can be input to the component. Further, subsequent to the start of the supply of the power from the series regulator 22 to the control board 3, the supply of the power from the switching regulator 11 is shut down. Accordingly, the supply of the power to the control board 3 can be continued without any interruption.

Hereinabove, the power supply, the image forming device, and the power supply method are explained by the embodiments. However, the present invention is not limited to the above-described embodiments, and various modifications and improvements may be made within the scope of the present invention.

The present application is based on Japanese Priority Application No. 2012-039894 filed on Feb. 27, 2012, the entire contents of which are hereby incorporated herein by reference.

What is claimed is:

1. A power supply configured to supply power to a load during a first mode and a second mode, the power supply comprising:
    a first voltage generating unit configured to generate a first voltage from an external power supply;
    a second voltage generating unit configured to generate a first predetermined voltage from the first voltage and configured to supply the generated first predetermined voltage to the load, wherein the second voltage generating unit is coupled to the first voltage generating unit, and the second voltage generating unit is configured to operate when the first voltage is greater than or equal to a threshold value;
    a third voltage generating unit configured to generate the first predetermined voltage from the first voltage and configured to supply the generated first predetermined voltage to the load, the third voltage generating unit being coupled to the first voltage generating unit; and
    a controller configured to cause the first voltage generated by the first voltage generating unit to be greater than or equal to the threshold value during the first mode, and configured to cause the first voltage generated by the first voltage generating unit to be less than the threshold value during the second mode,
    wherein, during the first mode, the power is supplied from at least one of the second voltage generating unit and the third voltage generating unit to the load, and
    wherein, during the second mode, the power is supplied from the third voltage generating unit to the load.

2. The power supply according to claim 1, further comprising:
    a switching unit configured to switch a state of the first voltage generating unit and the third voltage generating unit between a conducting state and a cut off state, based on control of the controller,
    wherein, during the first mode, the controller causes the switching unit to switch the state to be the cut off state, and
    wherein, during the second mode, the controller causes the switching unit to switch the state to be in the conducting state.

3. The power supply according to claim 2,
    wherein, when the controller switches from the first mode to the second mode, the controller causes the first voltage generated by the first voltage generating unit to be less than the threshold value, and after a predetermined time elapses, the controller causes the switching unit to switch the state to be the conducting state.

4. The power supply according to claim 3,
    wherein, during the first mode, the controller causes the first voltage generated by the first voltage generating unit to be a third voltage, the third voltage being greater than or equal to the threshold value,
    wherein, when the controller switches from the first mode to the second mode, the controller causes the first voltage generated by the first voltage generating unit to be less than the third voltage and greater than or equal to the threshold value, subsequently the controller causes the switching unit to switch the state to be the conducting state, and subsequently the controller causes the first voltage generated by the first voltage generating unit to be less than the threshold value.

5. The power supply according to claim 2, further comprising:
    a voltage detecting unit configured to detect a voltage supplied to the switching unit;

wherein, when the controller switches from the first mode to the second mode, the controller causes the first voltage generated by the first voltage generating unit to be less than the threshold value, and subsequently the controller causes the switching unit to switch the state to be the conducting state, when the voltage detecting unit detects a second predetermined voltage.

6. The power supply according to claim 1,
wherein the second voltage generating unit is a switching regulator, and
wherein the third voltage generating unit is a series regulator.

7. An image forming device comprising:
a power supply configured to supply power to a load during a first mode and a second mode,
wherein the power supply includes
a first voltage generating unit configured to generate a first voltage from an external power supply;
a second voltage generating unit configured to generate a first predetermined voltage and configured to supply the generated first predetermined voltage to the load, wherein the second voltage generating unit is coupled to the first voltage generating unit, and the second voltage generating unit is configured to operate when the first voltage is greater than or equal to a threshold value;
a third voltage generating unit configured to generate the first predetermined voltage from the first voltage and configured to supply the generated first predetermined voltage to the load, the third voltage generating unit being coupled to the first voltage generating unit; and
a controller configured to cause the first voltage generated by the first voltage generating unit to be greater than or equal to the threshold value during the first mode, and configured to cause the first voltage generated by the first voltage generating unit to be less than the threshold value during the second mode,
wherein, during the first mode, the power is supplied from at least one of the second voltage generating unit and the third voltage generating unit to the load, and
wherein, during the second mode, the power is supplied from the third voltage generating unit to the load.

8. A power supply method of supplying power to a load during a first mode and a second mode, the power supply method comprising:
a first voltage generating step of generating a first voltage from an external power supply;
a second voltage generating step of generating, when the first voltage is greater than or equal to a threshold value, a first predetermined voltage from the first voltage generated at the first voltage generating step and supplying the generated first predetermined voltage to the load; and
a third voltage generating step of generating the first predetermined voltage from the first voltage generated at the first voltage generating step and supplying the generated first predetermined voltage to the load,
wherein, during the first mode, the first voltage generated at the first voltage generating step is greater than or equal to the threshold value, and
wherein, during the second mode, the first voltage generated at the first voltage generating step is less than the threshold value.

9. The power supply of claim 1, wherein the first voltage generating unit is a commercial power supply.

10. The image forming device of claim 7, wherein the first voltage generating unit is a commercial power supply.

11. The method of claim 8, wherein the external power supply is a commercial power supply.

* * * * *